(12) United States Patent
Kimata

(10) Patent No.: US 8,258,509 B2
(45) Date of Patent: Sep. 4, 2012

(54) MICRO VACUUM GAUGE

(75) Inventor: Masafuni Kimata, Kusatsu (JP)

(73) Assignee: The Ritsumeikan Trust (JP)

( * ) Notice: Subject to any disclaimer, the term of this patent is extended or adjusted under 35 U.S.C. 154(b) by 145 days.

(21) Appl. No.: 12/865,139

(22) PCT Filed: Jan. 30, 2009

(86) PCT No.: PCT/JP2009/051533
§ 371 (c)(1),
(2), (4) Date: Jul. 29, 2010

(87) PCT Pub. No.: WO2009/096504
PCT Pub. Date: Aug. 6, 2009

(65) Prior Publication Data
US 2010/0327279 A1   Dec. 30, 2010

(30) Foreign Application Priority Data
Jan. 31, 2008  (JP) .................................. 2008-021826

(51) Int. Cl.
*H01L 23/58* (2006.01)
*H01L 31/058* (2006.01)
*G01L 19/64* (2006.01)

(52) U.S. Cl. .................. 257/48; 257/467; 257/E31.001; 257/E29.334; 73/708

(58) Field of Classification Search .................. 257/48, 257/292, 431, E31.001, E29.324, 414, 444, 257/467; 73/700, 705, 708
See application file for complete search history.

(56) References Cited

U.S. PATENT DOCUMENTS 5,560,711 A * 10/1996 Bu .................................. 374/109
2003/0209669 A1 * 11/2003 Chou ............................ 250/343

FOREIGN PATENT DOCUMENTS

| JP | 7-325002 | 12/1995 |
| JP | 8-166269 | 6/1996 |
| JP | 2006-323072 | 11/2003 |
| JP | 2006-153782 | 6/2006 |

OTHER PUBLICATIONS

Konz et al., "Micromachined IR-source with excellent blackbody like behavior", 2005, SPIE, vol. 5836, pp. 540-548.*
English Abstract of JP7-325002, Dec. 12, 1996.
English Abstract of JP2006-153782, Jun. 15, 2006.
English Abstract of JP8-166269, Jun. 25, 1996.
English Abstract of JP989617, Mar. 18, 1980.
English Abstract of JP2006-323072, Nov. 14, 2006.
International Searc Report dated Mar. 3, 2009.

* cited by examiner

*Primary Examiner* — A. Sefer
*Assistant Examiner* — Nikolay Yushin
(74) *Attorney, Agent, or Firm* — Thomas, Kayden, Horstemeyer & Risley, LLP.

(57) ABSTRACT

A micro vacuum gauge includes a substrate, a floating structure that is held above the substrate by a supporting structure extending from the substrate in a state where the floating structure is thermally isolated from the substrate, a heat generator that is arranged in the floating structure to generate heat, and a temperature sensor that is arranged in the floating structure to measure a difference in temperature between the substrate and the floating structure. A second member having a lower emissivity than a first member surrounding the heat generator and the temperature sensor is formed at least on a surface of the floating structure by being joined to the first member.

9 Claims, 18 Drawing Sheets

[Fig.1]
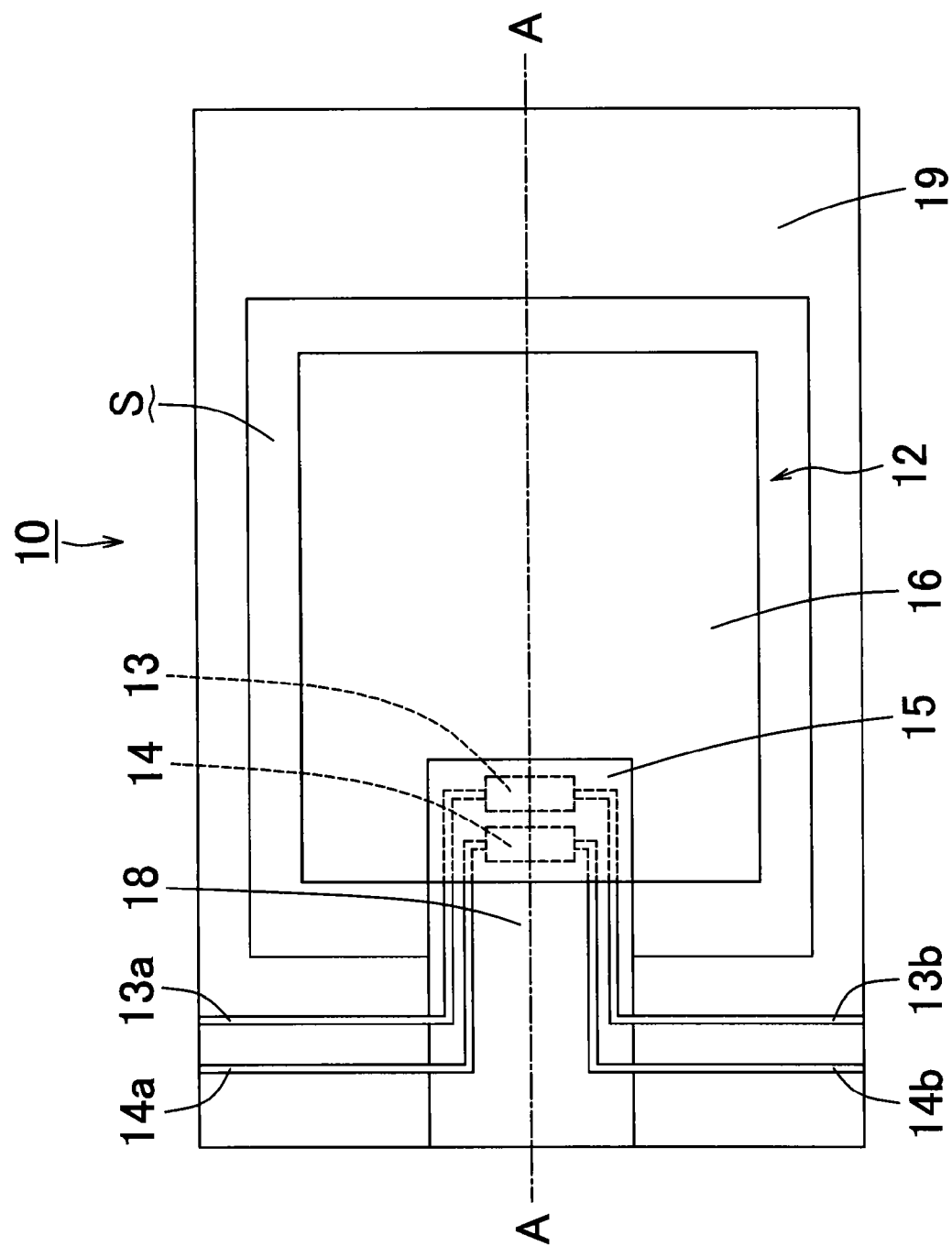

[Fig.2]
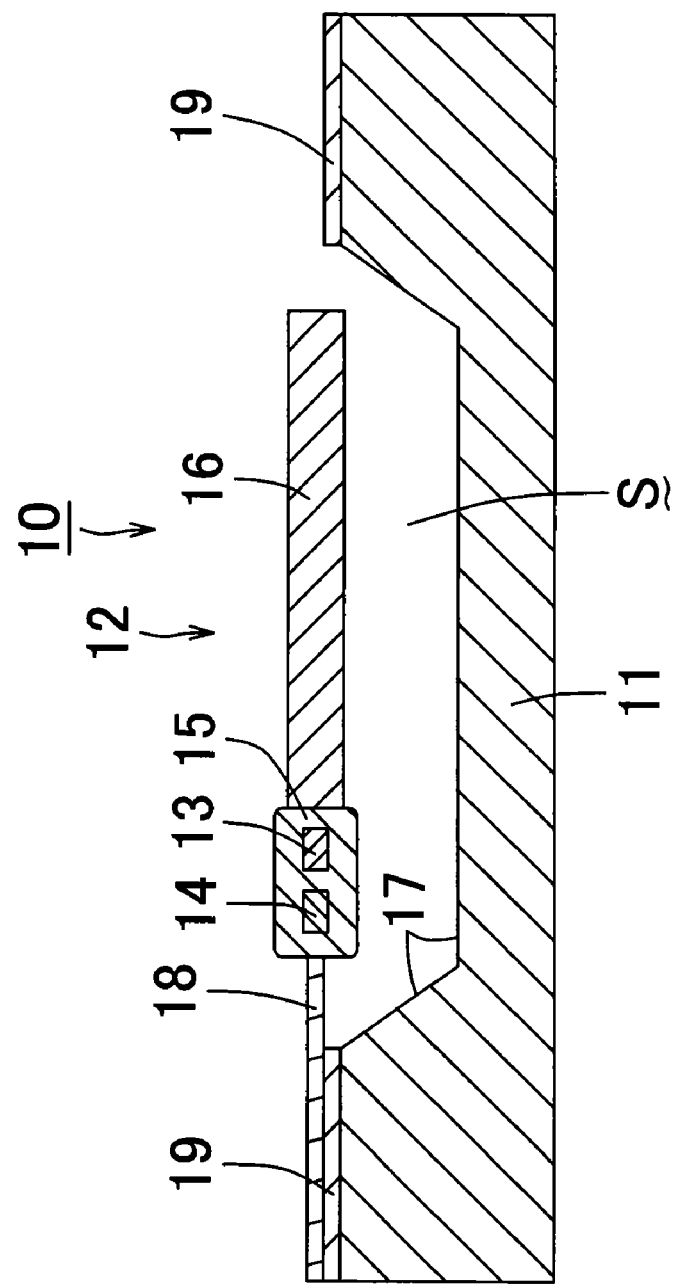

[Fig.3]
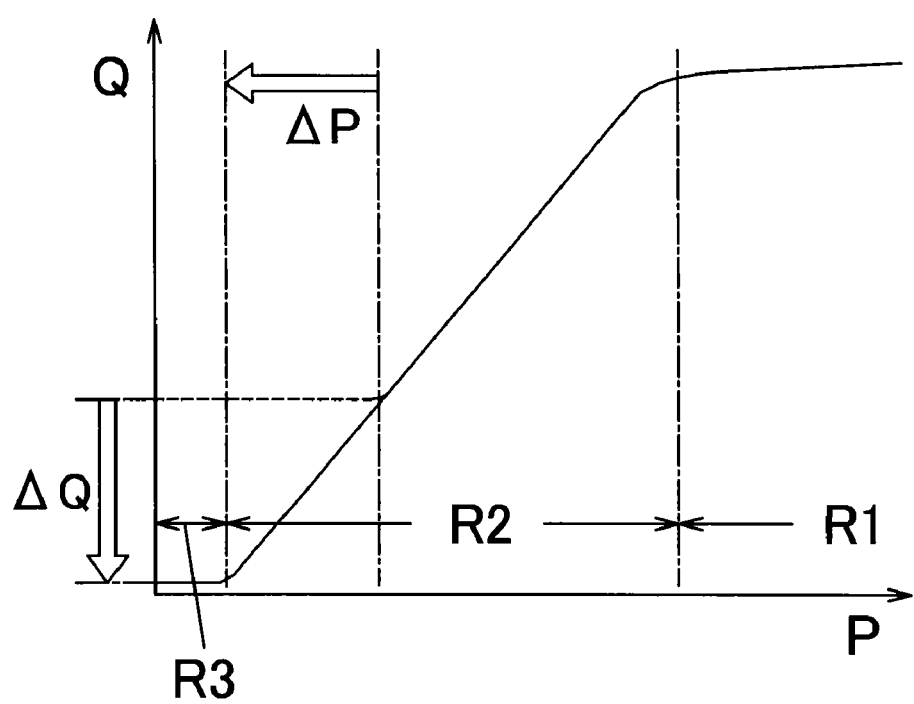

[Fig.4]
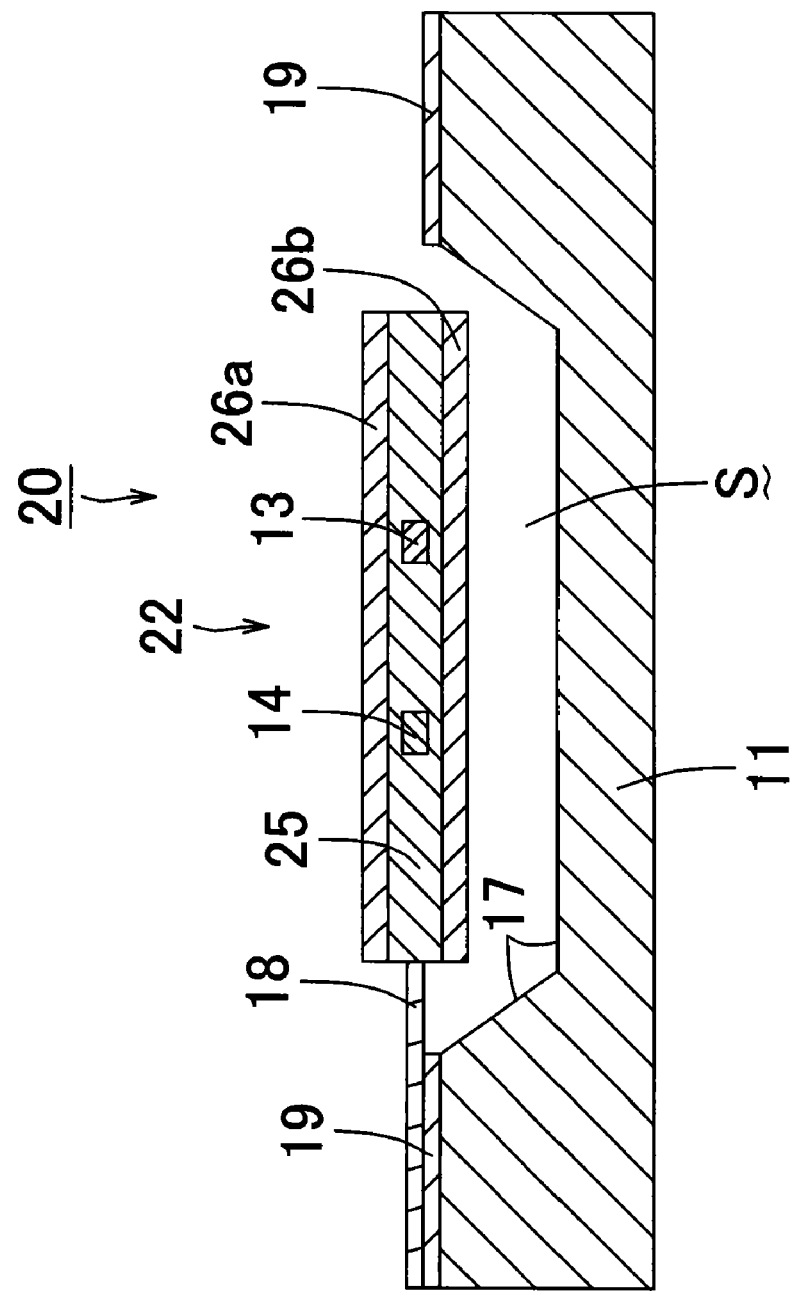

[Fig.5]
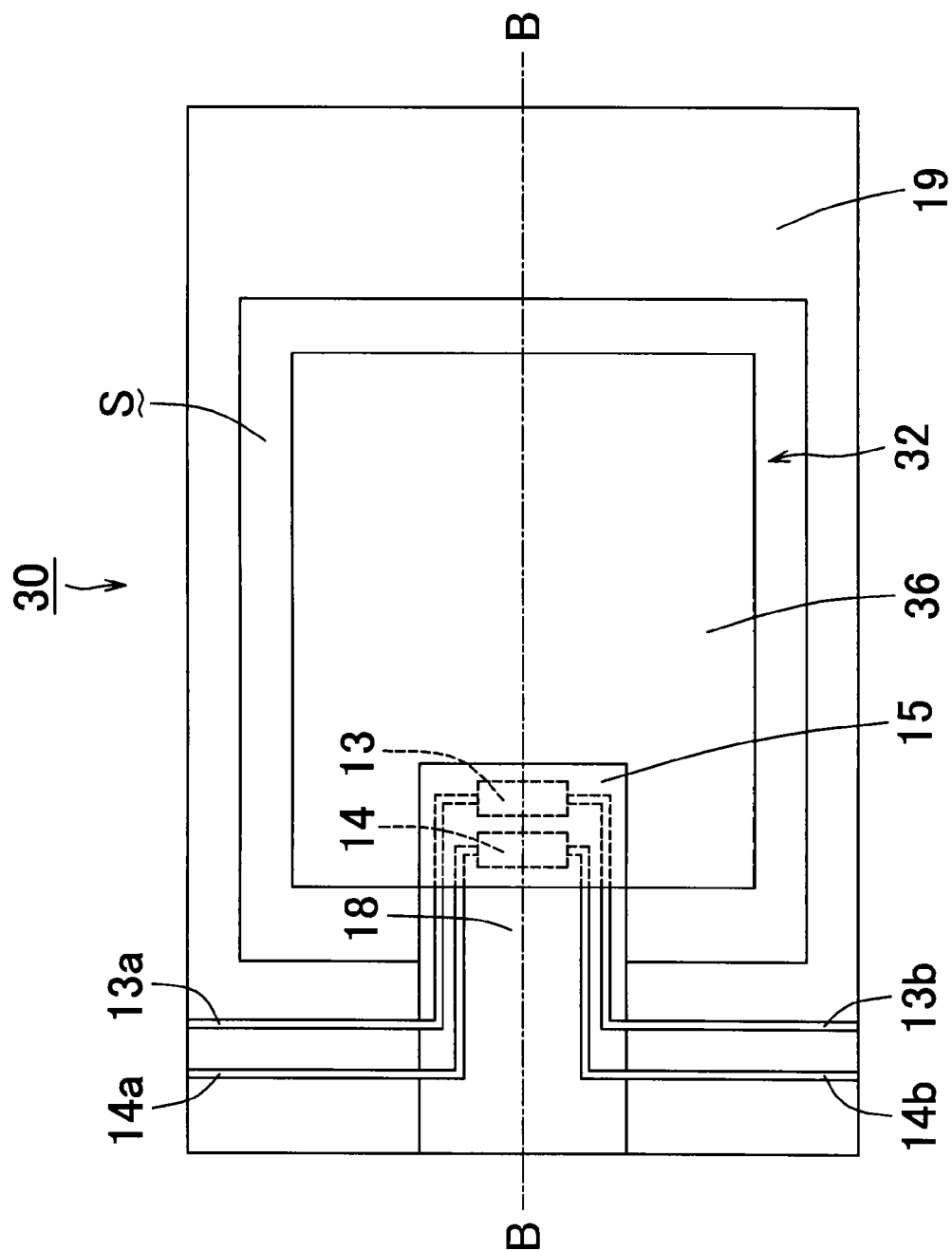

[Fig.6]
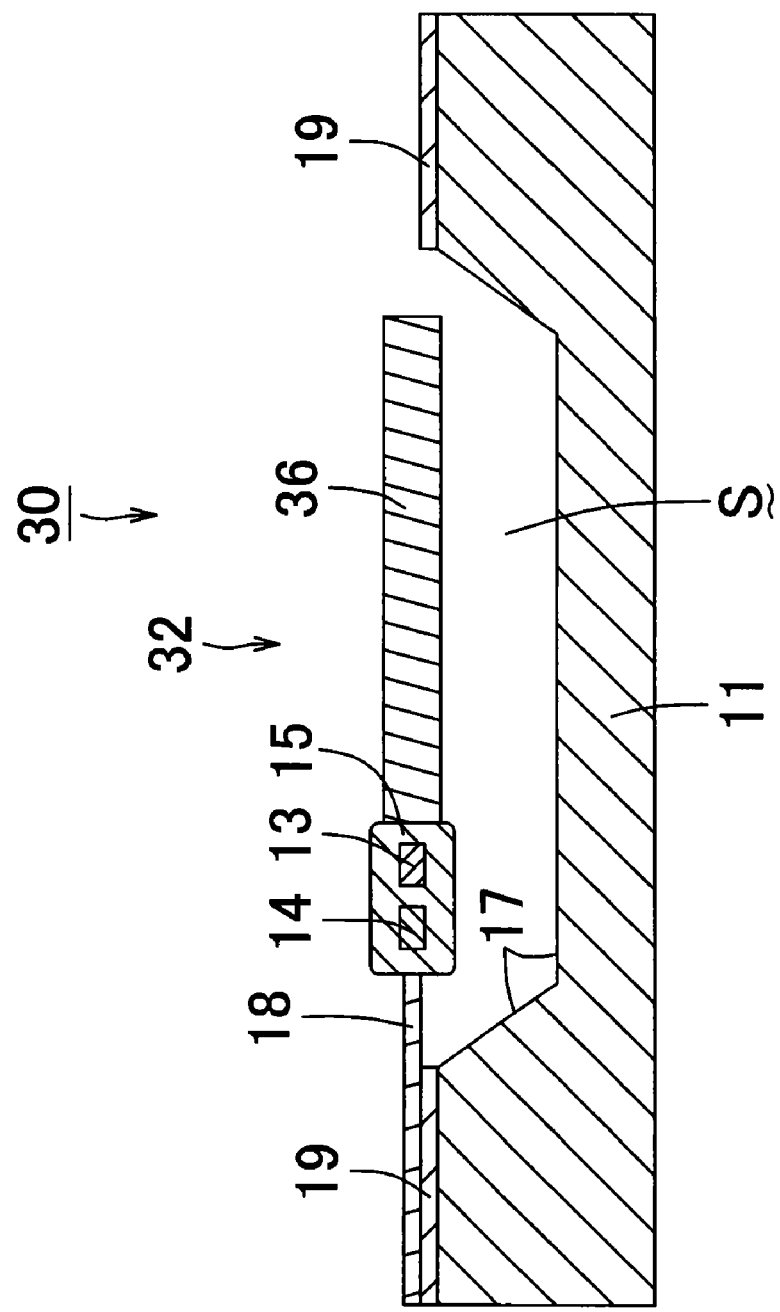

[Fig.7]
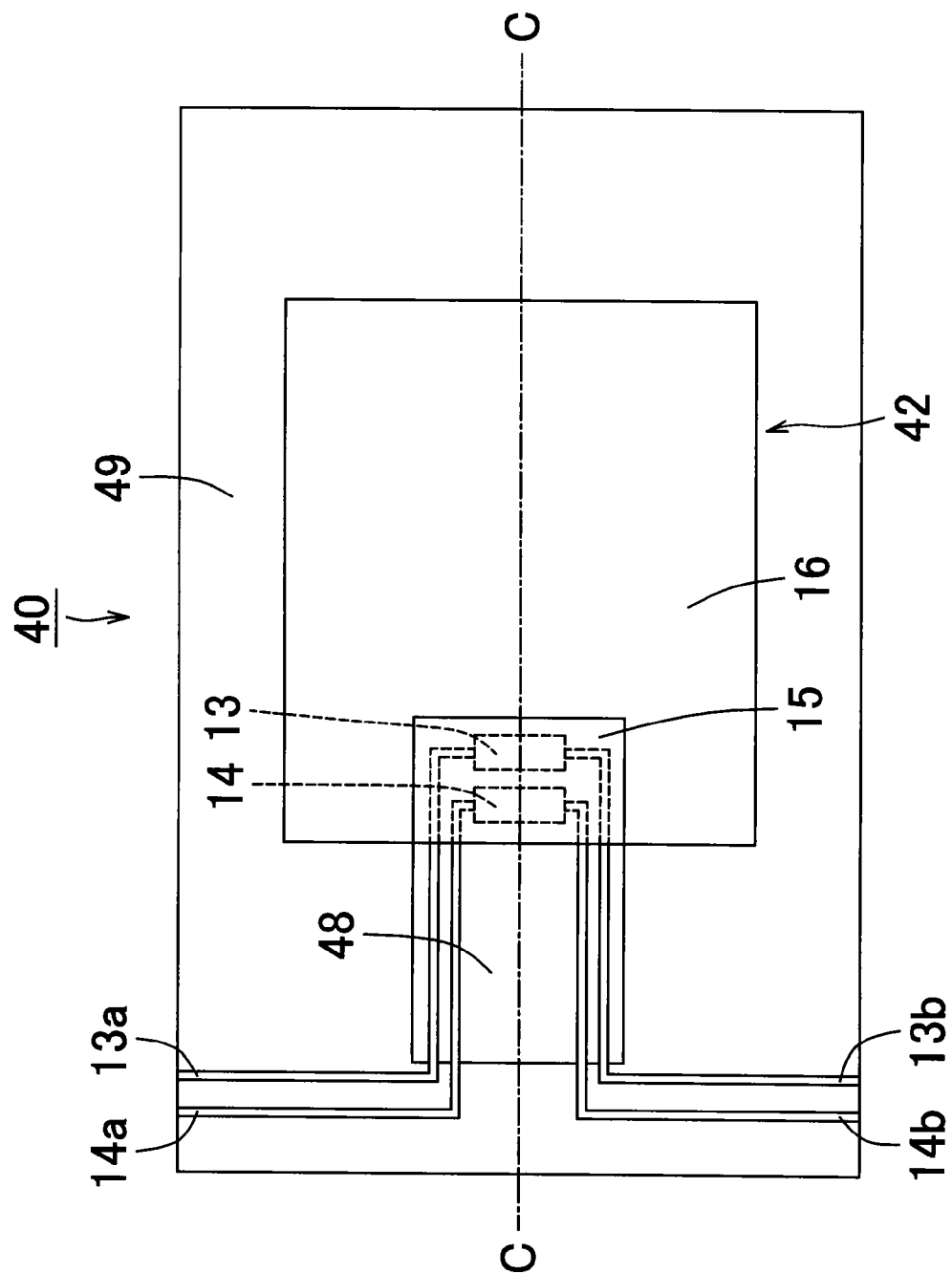

[Fig.8]
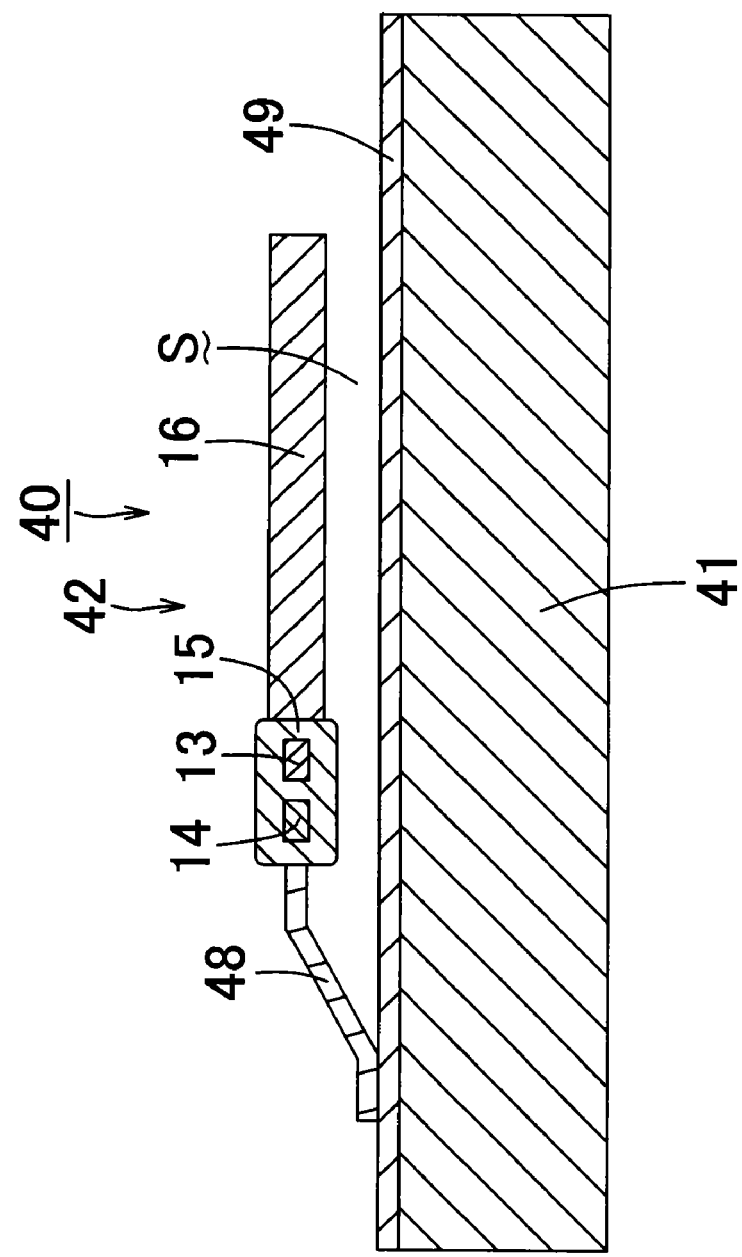

[Fig.9]
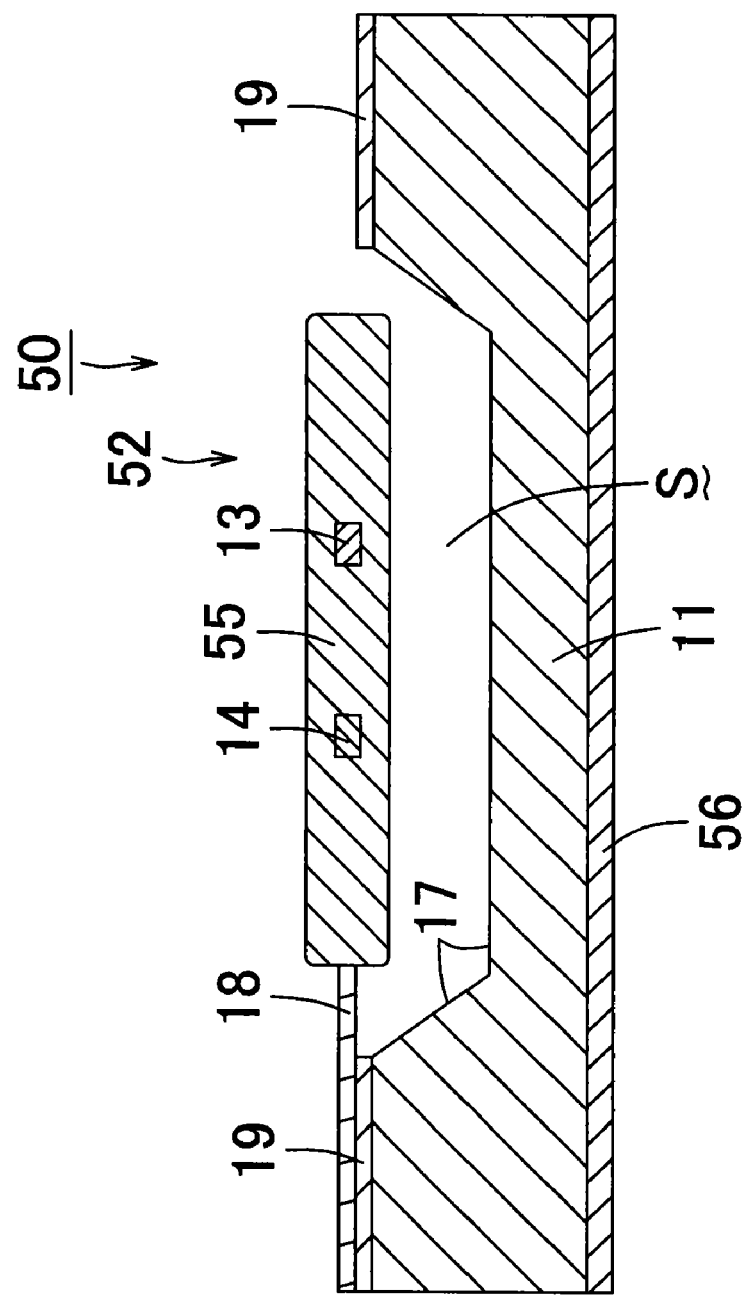

[Fig.10]
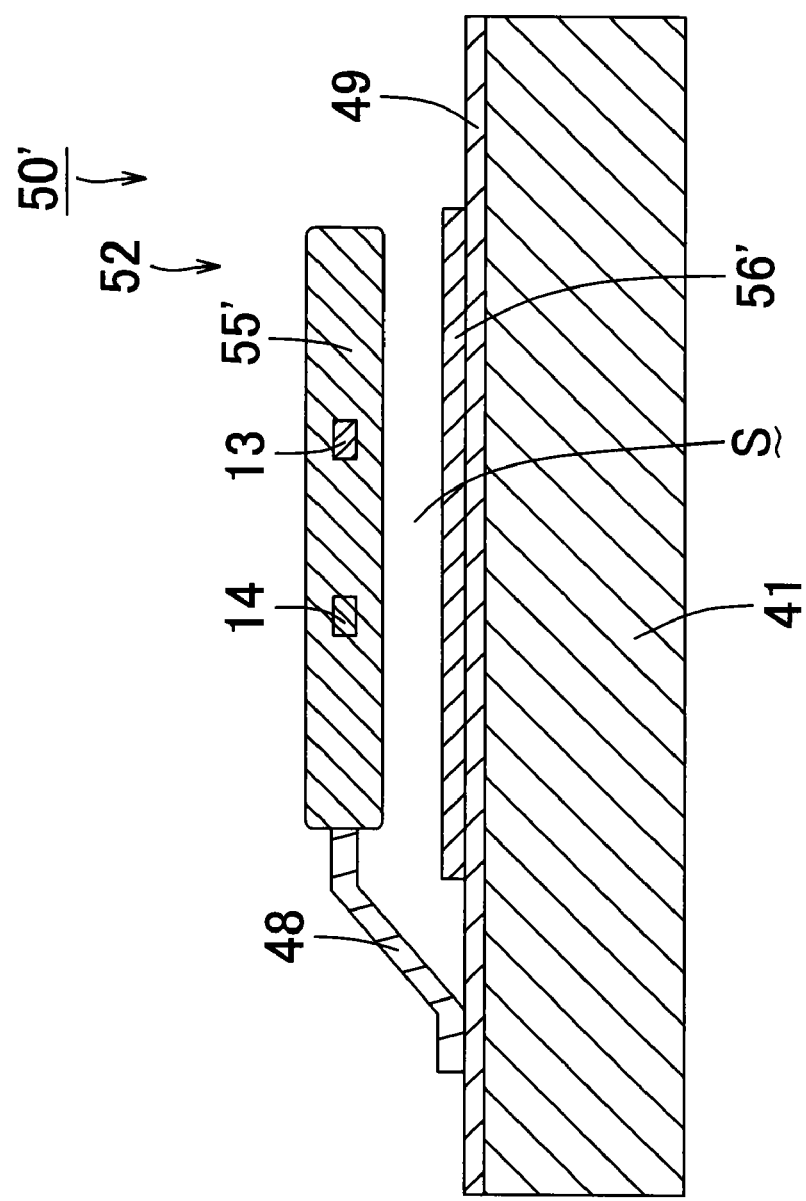

[Fig.11]
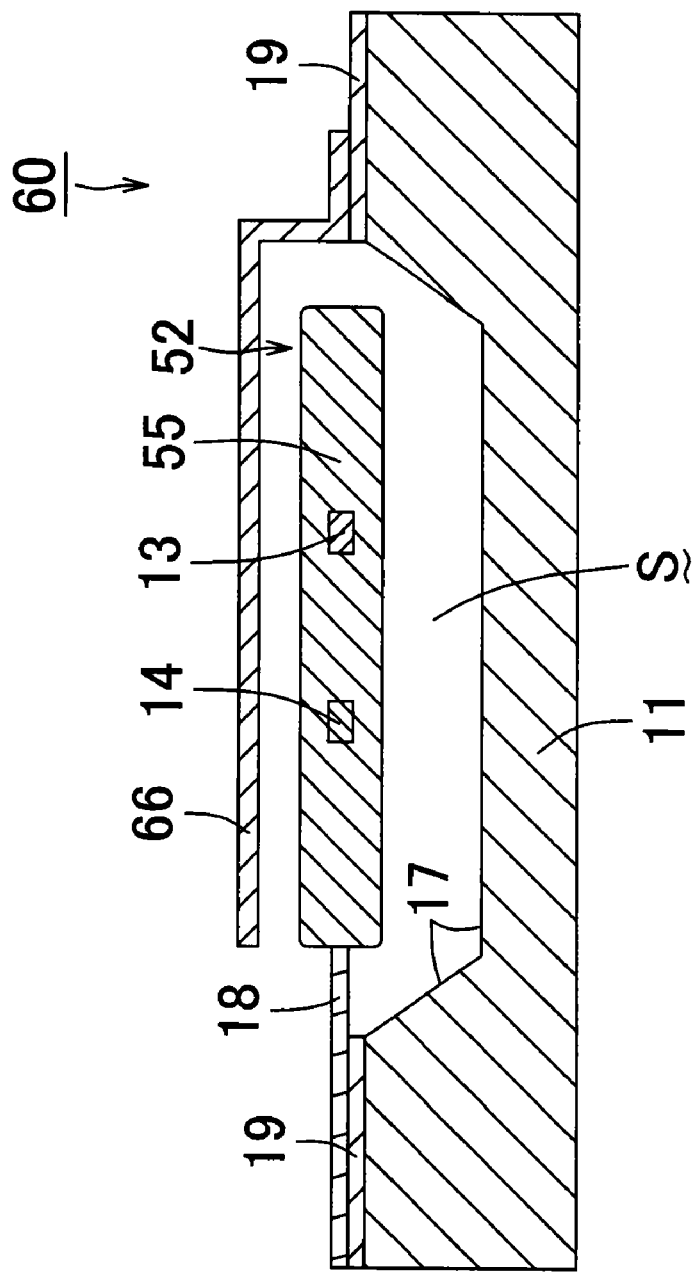

[Fig.12]
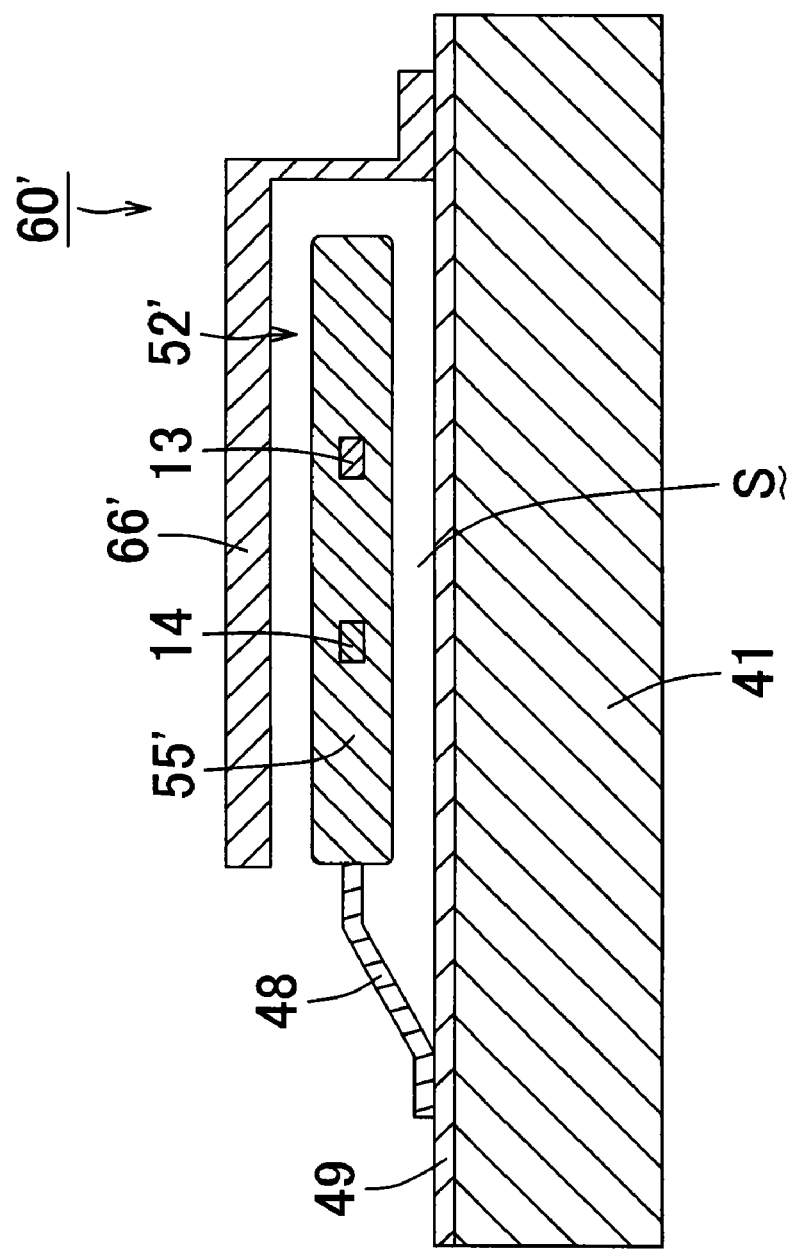

[Fig.13]
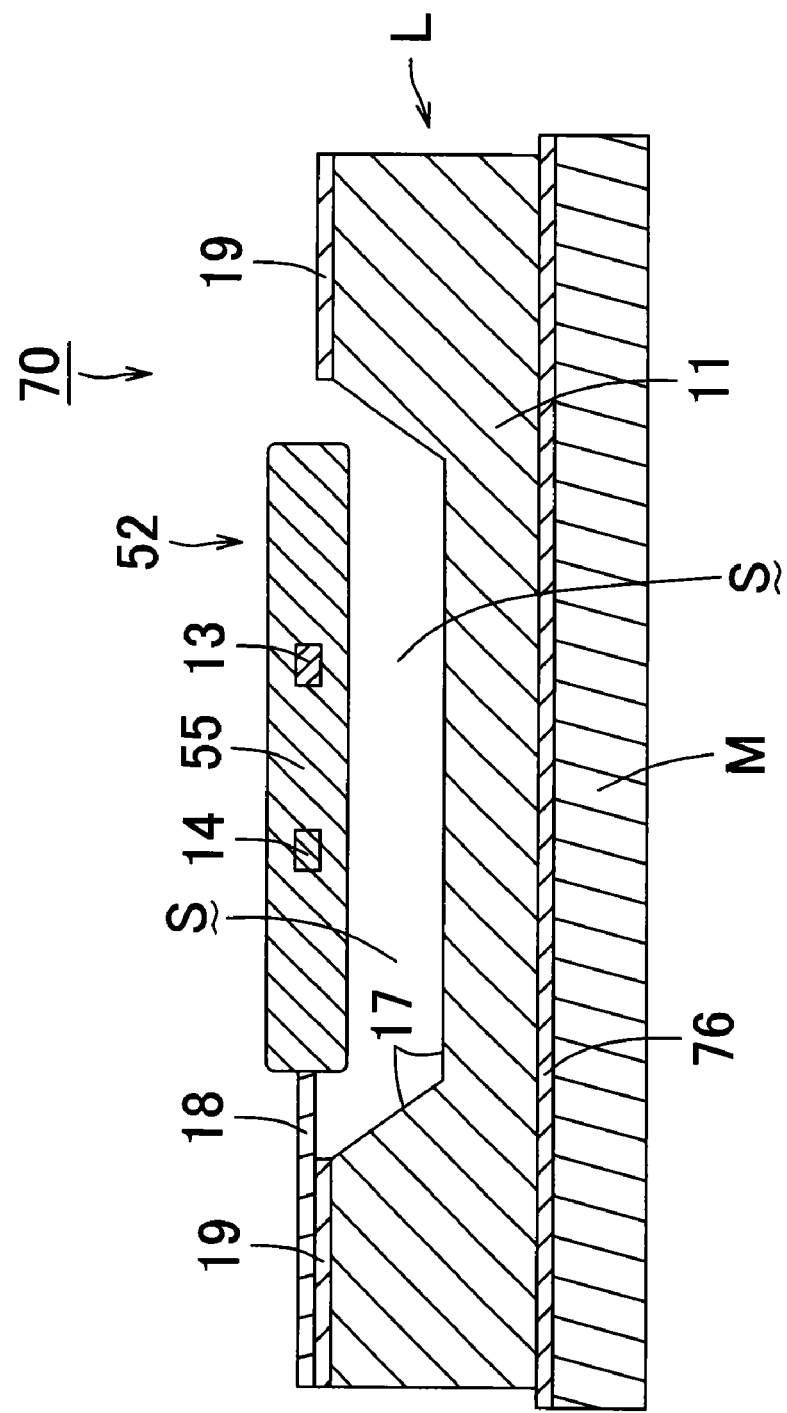

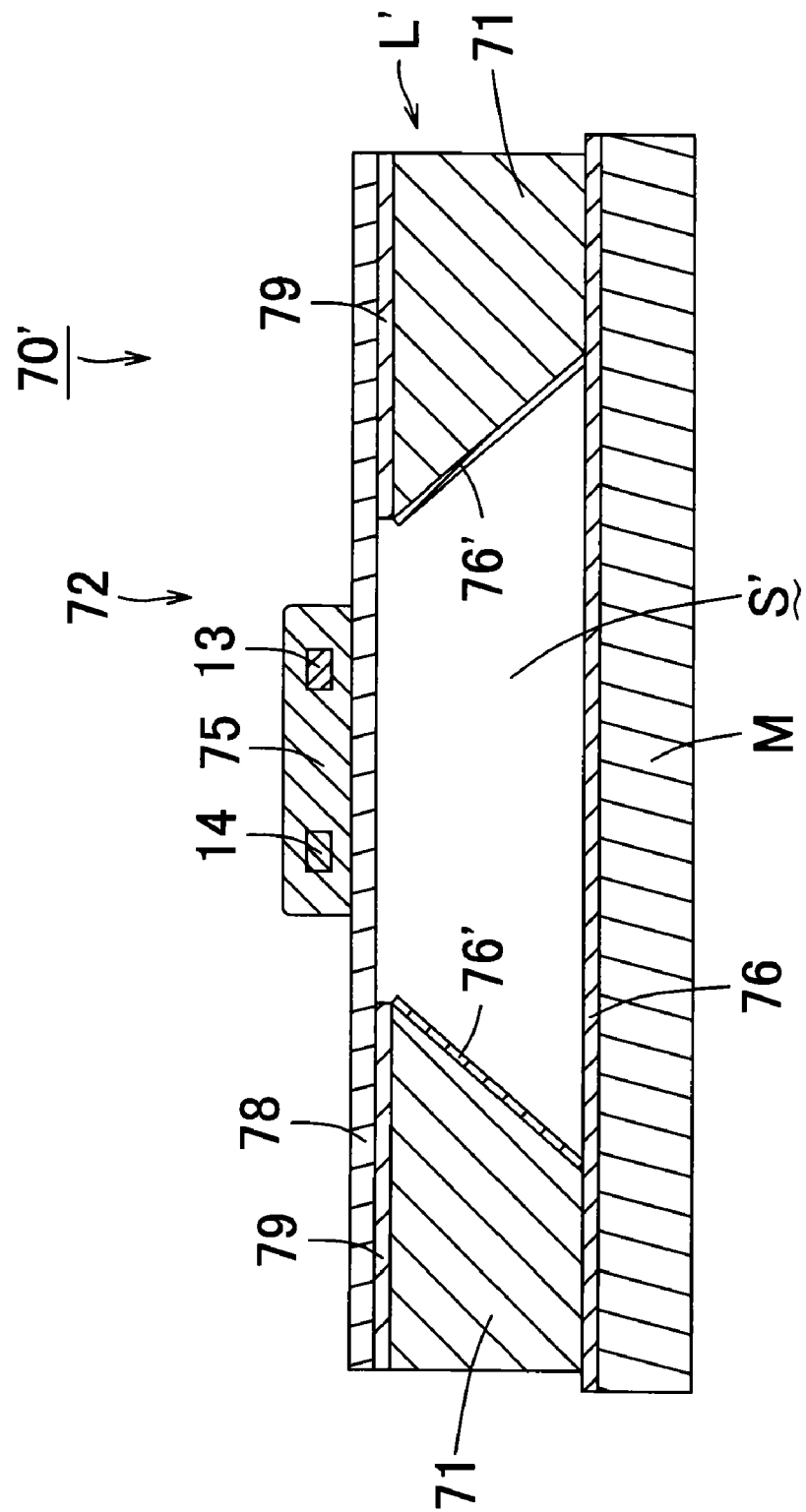
[Fig.14]

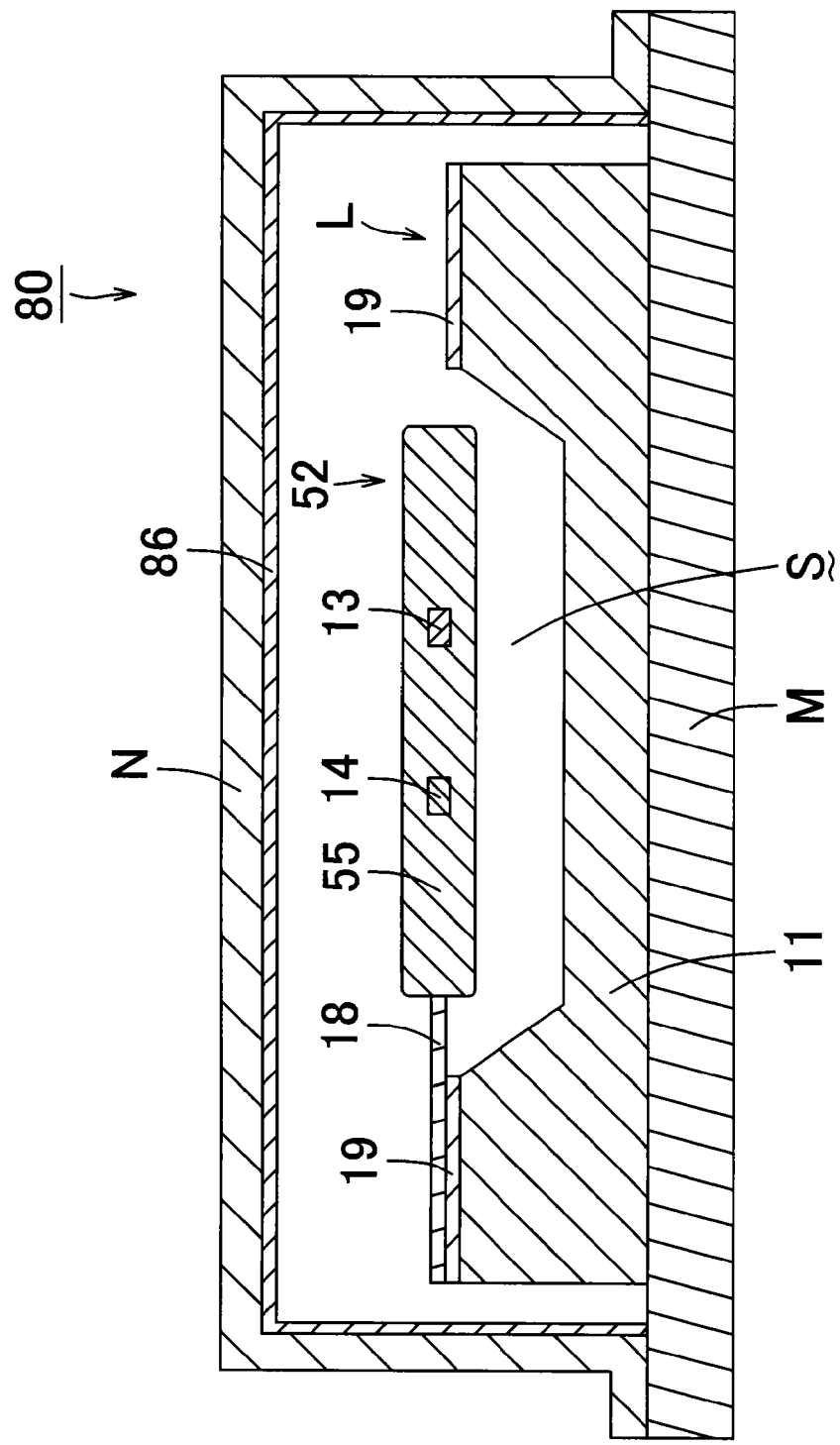
[Fig.15]

[Fig.16]
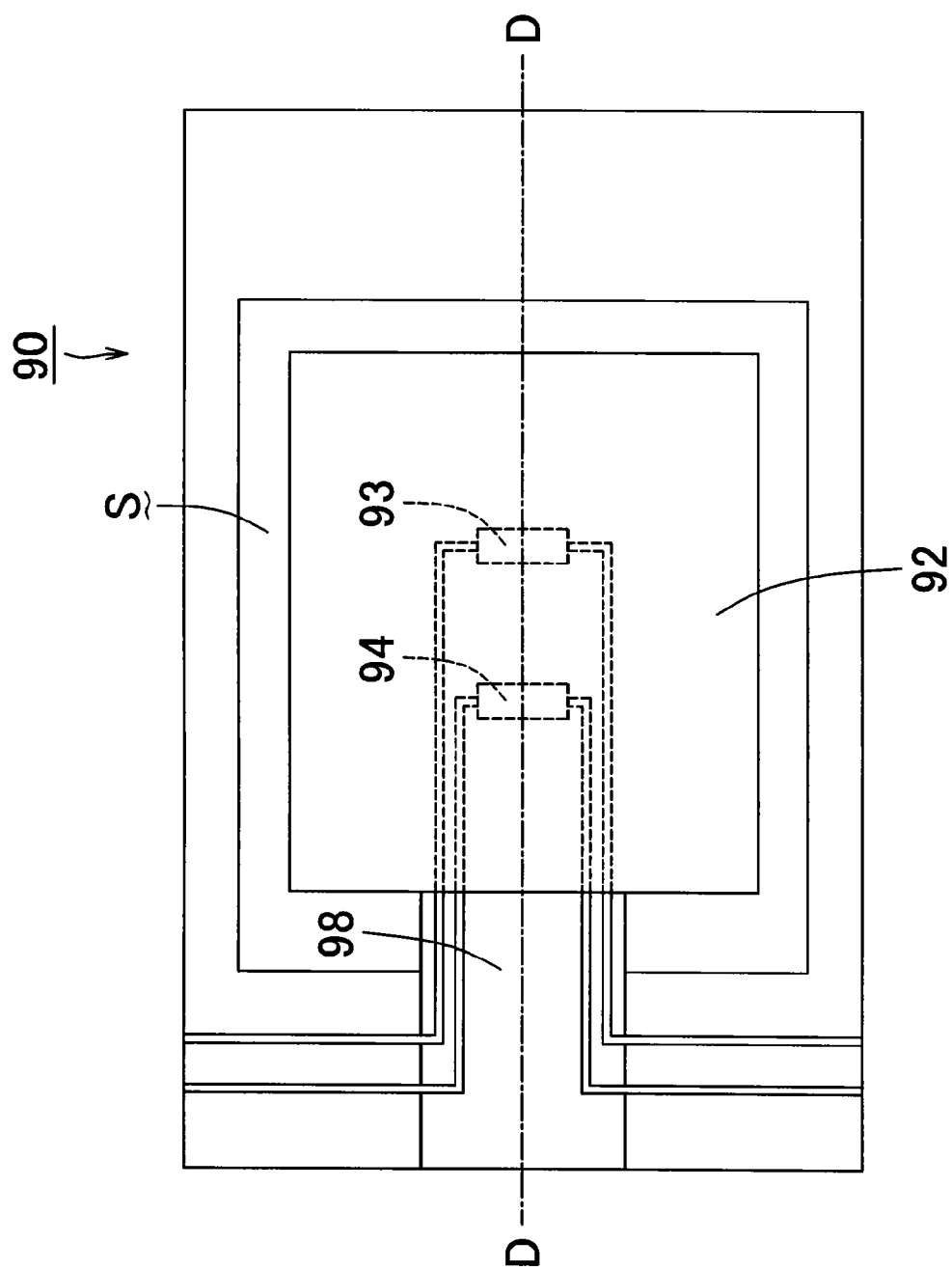

[Fig.17]
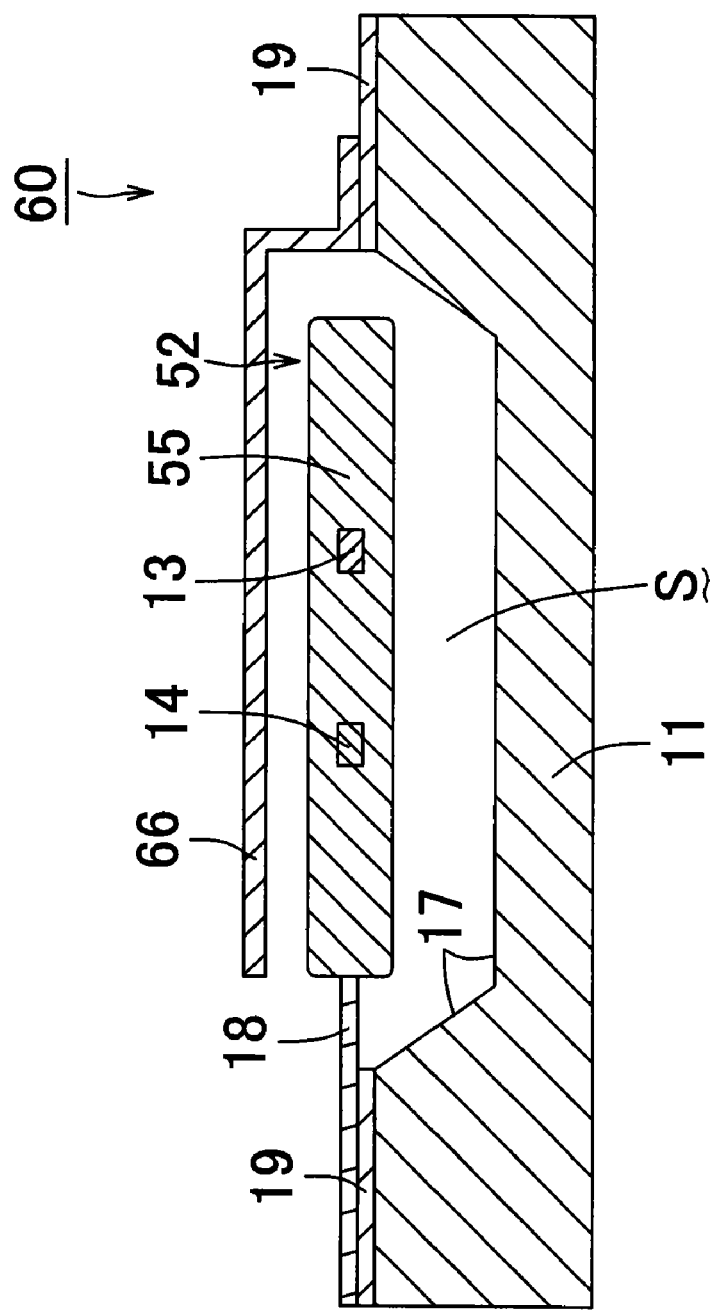

[Fig.18]
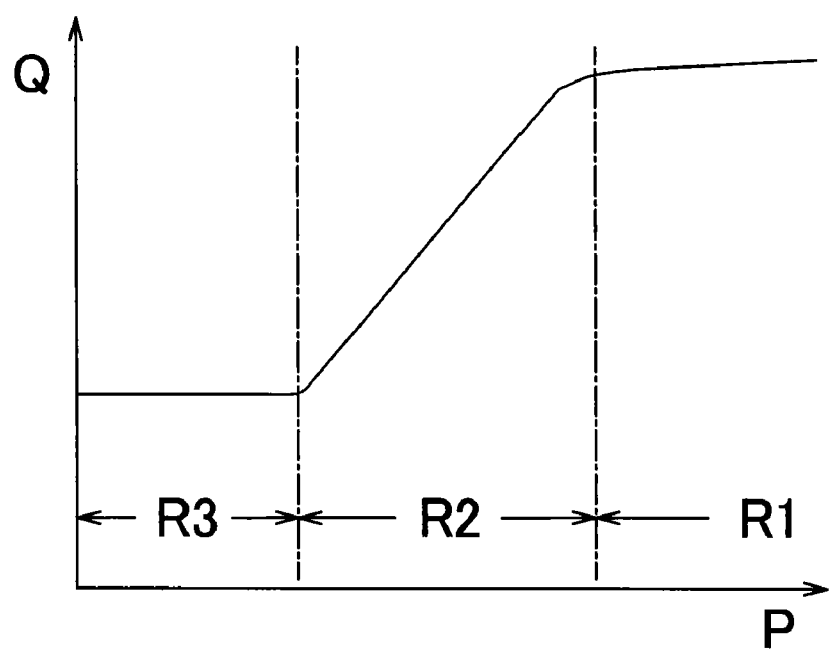

MICRO VACUUM GAUGE

TECHNICAL FIELD

The present invention relates to a micro vacuum gauge that measures a pressure inside a vacuum vessel where a pressure is reduced to be lower than an atmospheric pressure. Particularly, the present invention relates to a micro vacuum gauge that measures a low-pressure region, which is necessary for a device utilizing an MEMS (Micro-Electro-Mechanical Systems) technique.

BACKGROUND ART

Among electronic devices, there are some devices or the like utilizing an MEMS technique that dramatically increase performance by being mounted into a vacuum-sealed package.

For example, in a thermal infrared sensor, heat dissipation from a sensor structure largely affects performance, and thus, it is desired to reduce heat conduction through the atmosphere as much as possible. Moreover, some of acceleration sensors and angler speed sensors are, for a specific purpose, required to be operated in a vacuum environment in order to reduce damping by the atmosphere (mechanical resistance of the air). Furthermore, in a radio-frequency device, vacuum sealing is performed for the purpose of increasing properties of a resonator, which is a vibrating device, or for the purpose of preventing sticking of a device involving mechanical contact such as a switch (sticking of a movable structure to a substrate).

For reliability test or self-diagnosis (a function included in a production to check that the product is normally operating) of such an electronic device requiring the vacuum sealing, pressure (atmospheric pressure) inside the package containing the device needs to be measured.

As pressure measurement of gas in a minute space such as the package of the electronic device, there have been a micro vacuum gauge by a heat conduction method, and the like, in which a minute heater that can be manufactured in a semiconductor process is held adiabatically (in a state where heat conductance is low) from a semiconductor substrate, and pressure dependency of the heat conduction of this gas is utilized (e.g., refer to Non-Patent Document 1).

Non-Patent Document 1: A. W. van Herwaarden and P. M. Sarro, J. Vac. Sci. Technol., Vol. A5, No. 4, pp. 2454-2457, 1987.

A conventional micro vacuum gauge 90 by a heat conduction method, as seen from a basic structure shown in FIGS. 16 and 17, has a floating structure 92 held above a hollow space S formed in a semiconductor substrate 91, and in the floating structure 92, a heater 93 and a temperature sensor 94 are arranged. While in an example shown in the figures, the floating structure 92 is supported by a supporting structure 98 so as to be supported at almost the same height as that of an upper surface of the semiconductor substrate 91, a structure can also be employed, in which the floating structure 92 is elevated upward from the upper surface of the semiconductor substrate 91.

Next, operation of the micro vacuum gauge 90 is described. When a current is passed through the heater 93 to generate Joule heat, a temperature of the floating structure 92 rises. The rise in temperature is decided by a power supplied to the heater 93, and a heat loss (transmitted heat quantity) flowing from the floating structure 92 to the semiconductor substrate 91 serving as a heat sink and peripheral structures not shown. This heat loss is due to three factors of heat conduction through gas surrounding the floating structure 92, heat conduction through the supporting structure 98, and heat radiation from the floating structure 92.

A relationship between a heat loss Q from the floating structure 92 and a pressure P of the ambient gas can be considered by dividing into three regions R1, R2, R3, as shown in FIG. 18 in which a vertical axis and a horizontal axis are both logarithmic axes. The region R1 is a region where the fact that since it is a region of a high pressure, an average free path of the gas is shorter than a length of the hollow space S so that the heat conduction of the gas does not depend on the pressure P is reflected, and thus, the heat loss Q hardly depends on the pressure P although the region has slight pressure dependency by an effect of convection. The region R2 is a region in which since the average free path of the gas is longer than the length of the hollow space S, the heat conduction through the gas is proportional to the pressure (molecular density) of the gas, and with reduction in pressure, the heat loss is reduced. The region R3 is a low-pressure region with the heat loss Q at a lowest level, in which the heat loss Q does not depend on the pressure P of the gas, and the heat loss by the heat conduction through the supporting structure 98 and the heat loss by the heat emission (heat radiation) from the floating structure 92 are added.

Taking into consideration the above-described dependency of the heat loss on the pressure of the ambient gas, a temperature measured in the temperature sensor 94 does not change in the region R1 when a constant current is supplied to the heater 93, so that the pressure cannot be measured, while in the region R2, since the heat conduction through the gas is reduced with the decrease in pressure, the temperature rises, and in the region R3, the pressure dependency is again eliminated, so that the temperature becomes constant. Accordingly, the conventional micro vacuum gauge 90 by the heat conduction method can measure the pressure only in the range of the region R2, and a lower limit thereof is about 1 Pa.

DISCLOSURE OF THE INVENTION

Problems to be Solved by the Invention

There has been a problem that the conventional micro vacuum gauge 90 by the heat conduction method cannot measure a sufficiently low pressure. Particularly, there has been a problem that the conventional micro vacuum gauge 90 by the heat conduction method cannot measure pressure change inside the package of the thermal infrared sensor, which is vacuum-sealed to be used. That is, the heat loss mechanism of the micro vacuum gauge by the heat conduction method is the same as the thermal loss mechanism of the thermal infrared sensor, which is vacuum-sealed to be used, and a pressure region in which sensitivity of the thermal infrared sensor depends on a pressure of gas inside the sealed package almost coincides with the region R2. Thus, since a sufficiently low pressure is kept so that the pressure of the gas inside the package does not affect the sensitivity, the pressure change inside the package cannot be measured, resulting in a problem in conducting a reliability test and self-diagnosis. If detecting slight deterioration in vacuum degree is enabled, the occurrence of a defect and the like can be advantageously detected earlier.

While in a vacuum-sealed device other than the thermal infrared sensor as well, detecting slight deterioration in vacuum degree inside the package is important in device development, there has so far been no micro vacuum gauge that satisfies such a demand.

The present invention has been devised to solve the above-described problem, and an object thereof is to expand a measurable pressure range to the lower pressure side so as to be able to conduct a reliability test and self-diagnosis of a device by a micro vacuum gauge by a heat conduction method, which is integrated in an MEMS device or the like, to increase a measurement lower limit. Furthermore, another object thereof is to expand a measurement range of an extremely compact, micro vacuum gauge by a heat conduction method capable of pressure measurement in a minute space, thereby expanding an application field of the micro vacuum gauge.

Means for Solving the Problems

A micro vacuum gauge according to the present invention to achieve the above-described objects is a micro vacuum gauge including a substrate, a floating structure that is held above the substrate by a supporting structure extending from the substrate in a state where the floating structure is thermally isolated from the substrate, a heat generator that is arranged in the floating structure to generate heat, and a temperature sensor that is arranged in the floating structure to measure a difference in temperature between the substrate and the floating structure, wherein the floating structure is formed of a first member surrounding the heat generator and the temperature sensor, and a second member having a lower emissivity than the first member and joined to at least a surface of the first member, and an area of the second member in top view is larger than that of the first member.

The micro vacuum gauge according to the present invention has a feature in that the second member has a higher reflectance than the first member.

The micro vacuum gauge according to present invention has a feature in that the first member is made of silicon dioxide or silicon nitride, and the second member is made of aluminum, titanium, gold, tungsten or platinum.

A micro vacuum gauge according to present invention is a micro vacuum gauge including a substrate, a floating structure that is held above the substrate by a supporting structure extending from the substrate in a state where the floating structure is thermally isolated from the substrate, a heat generator that is arranged in the floating structure to generate heat and a temperature sensor that is arranged in the floating structure to measure a difference in temperature between the substrate and the floating structure, wherein the floating structure is formed of a first member surrounding the heat generator and the temperature sensor, and a second member having a lower emissivity than the first member and joined to at least a surface of the first member, and the second member has a higher transmittance than the first member.

The micro vacuum gauge according to present invention has a feature in that the first member is made of silicon dioxide or silicon nitride, and the second member is made of single-crystal silicon, polycrystalline silicon, or amorphous silicon.

The micro vacuum gauge according to present invention has a feature in that a depressed portion is formed in an upper surface of the substrate, and the floating structure is held above the depressed portion by the supporting structure.

The micro vacuum gauge according to present invention has a feature in that an upper surface of the substrate is formed flatly, and the floating structure is held by the supporting structure so as to be elevated upward from the upper surface of the substrate.

The micro vacuum gauge according to present invention has a feature in that the second member is made of a laminated structure of a plurality of thin films.

A micro vacuum gauge according to present invention is a micro vacuum gauge including a substrate, a floating structure that is held above the substrate by a supporting structure extending from the substrate in a state where the floating structure is thermally isolated from the substrate, a heat generator that is arranged in the floating structure to generate heat, and a temperature sensor that is arranged in the floating structure to measure a difference in temperature between the substrate and the floating structure, wherein a depressed portion is formed in an upper surface of the substrate, and the floating structure is held above the depressed portion by the supporting structure, while the member reflecting the infrared rays is formed on a back surface of the substrate.

Effects of the Invention

According to the micro vacuum gauge of the present invention, since the floating structure is formed of a first member surrounding the heat generator and the temperature sensor, and a second member having a lower emissivity than the first member and joined to at least a surface of the first member, and an area of the second member in top view is larger than that of the first member, the heat loss by heat radiation from the floating structure is smaller than that of the conventional micro vacuum gauge in which the whole floating structure is made of the same material as that of the first member. Thus, a measurable pressure range in the micro vacuum gauge can be expanded to the lower pressure side.

According to the micro vacuum gauge of the present invention, since the second member has a higher reflectance than the first member, the emissivity of the second member can be made lower than that of the first member.

According to the micro vacuum gauge of the present invention, since the second member has a higher transmittance than the first member, the emissivity of the second member can be made lower than that of the first member.

According to the micro vacuum gauge of the present invention, since the floating structure is held above the depressed portion formed in the upper surface of the substrate, the hollow space can be easily provided between the floating structure and the substrate.

According to the micro vacuum gauge of the present invention, since the upper surface of the substrate is formed flatly, and the floating structure is held by the supporting structure so as to be elevated upward from the upper surface of the substrate, the hollow space can be easily provided between the floating structure and the substrate.

According to the micro vacuum gauge of the present invention, since a depressed portion is formed in an upper surface of the substrate, and the floating structure is held above the depressed portion by the supporting structure, while a member that reflects the infrared rays to decrease energy loss by radiation from the floating structure is formed on the back surface of the substrate, the member can be easily formed. Moreover, the addition of the member can also be easily performed.

BRIEF DESCRIPTION OF THE DRAWINGS

FIG. 1 is a plan view showing a micro vacuum gauge 10 according to a first embodiment of the present invention.

FIG. 2 is a cross-sectional view along A-A in FIG. 1, showing the micro vacuum gauge 10.

FIG. 3 is a graph showing heat loss-pressure characteristics of the micro vacuum gauge 10.

FIG. 4 is a cross-sectional view showing a micro vacuum gauge 20 according to a second embodiment of the present invention.

FIG. 5 is a cross-sectional view showing a micro vacuum gauge 30 according to a third embodiment of the present invention.

FIG. 6 is a cross-sectional view along B-B in FIG. 5, showing the micro vacuum gauge 30.

FIG. 7 is a plan view showing a micro vacuum gauge 40 according to a fourth embodiment of the present invention.

FIG. 8 is a cross-sectional view along C-C in FIG. 7, showing the micro vacuum gauge 40.

FIG. 9 is a cross-sectional view showing a micro vacuum gauge 50 according to a fifth embodiment of the present invention.

FIG. 10 is a cross-sectional view showing a micro vacuum gauge 50' according to a modification of the fifth embodiment of the present invention.

FIG. 11 is a cross-sectional view showing a micro vacuum gauge 60 according to a sixth embodiment of the present invention.

FIG. 12 is a cross-sectional view showing a micro vacuum gauge 60' according to a modification of the sixth embodiment of the present invention.

FIG. 13 is a cross-sectional view showing a micro vacuum gauge 70 according to a seventh embodiment of the present invention.

FIG. 14 is a cross-sectional view showing a micro vacuum gauge 70' according to a modification of the seventh embodiment of the present invention.

FIG. 15 is a cross-sectional view showing a micro vacuum gauge 80 according to an eighth embodiment of the present invention.

FIG. 16 is a plan view showing a conventional micro vacuum gauge 90.

FIG. 17 is a cross-sectional view along D-D in FIG. 16, showing the conventional micro vacuum gauge 90.

FIG. 18 is a graph showing heat loss-pressure characteristics of the conventional micro vacuum gauge 90.

DESCRIPTION OF REFERENCE SIGNS 10, 20, 30, 40, 50, 50', 60, 60', 70, 70', 80: micro vacuum gauge
11, 41, 71: semiconductor substrate (substrate)
12, 22, 32, 42, 52, 62, 72: floating structure
13: heater (heat generator)
14: temperature sensor
15, 25, 55, 55', 75: first member
16, 26a, 26b: second member (high-reflectance thin film)
36: second member (high-transmittance thin film)
17: depressed portion
18, 48, 78: supporting structure
19, 49, 79: insulating film
56, 56', 66, 66', 76, 76', 86: member (high-reflectance thin film)
L: micro vacuum gauge element
M: package substrate
N: package cap
S: hollow space

BEST MODE FOR CARRYING OUT THE INVENTION

A micro vacuum gauge 10 according to a first embodiment of the present invention is described below with reference to the drawings. The micro vacuum gauge 10 is a micro vacuum gauge by a heat conduction method, including a semiconductor substrate (substrate) 11, and a floating structure 12 thermally isolated from the semiconductor substrate 11, as shown in FIGS. 1 and 2. In the floating structure 12, a heater (heat generator) 13 and a temperature sensor 14 are arranged. The floating structure 12 is made up of a first member 15 surrounding the heater 13 and the temperature sensor 14, and a second member 16 having a low emissivity than the first member 15. A depressed portion 17 is formed in an upper surface of the semiconductor substrate 11 so that the floating structure 12 is held above the depressed portion 17 by a supporting structure 18, and a hollow space (air gap) S is provided between the semiconductor substrate 11 and the floating structure 12 to separate space.

For the semiconductor substrate 11 and the first member 15, a silicon dioxide film $SiO_2$ or a silicon nitride film SiN, which is a representative material in the MEMS technique, can be used. The upper surface of the semiconductor substrate 11 other than a portion where the depressed portion 17 is formed is covered with an insulator thin film 19. The supporting structure 18 is made of an insulating material, and is constructed as a supporting leg that extends from a circumference of the depressed portion 17 of the semiconductor substrate 11 to hold the floating structure 12 above the depressed portion 17.

For the heater 13, a resistor made of polysilicon, or the like can be used. As the temperature sensor 14, a resistance bolometer, a diode, a thermoelectric device (thermocouple or thermopile) or the like can be used. However, a difference in temperature between the semiconductor substrate 11 and the floating structure 12 needs to be measured, in the others than the thermoelectric device from which output corresponding to the difference in temperature can be obtained, it is preferable to dispose a reference temperature sensor not shown on the semiconductor substrate 11. Moreover, to the heater 13 are connected heater wirings 13a, 13b, and to the temperature sensor 14 are temperature sensor wirings 14a, 14b. When the thermopile, which is one of the thermoelectric devices, is used as the temperature sensor 14, there may arise a necessity that a number of wirings are formed between the floating structure 12 and a region where the semiconductor substrate 11 serves as a heat sink.

The micro vacuum gauge 10 has the floating structure 12 with the hollow space S interposed between the semiconductor substrate 11 and itself, as in the aforementioned conventional micro vacuum gauge 90 shown in FIGS. 16 and 17. In the micro vacuum gauge 10, structures other than the floating structure 12 are similar to those of the conventional micro vacuum gauge 90. However, it is preferable that a planar size (in top view) of the first member 15 in the floating structure 12 is a minimum size necessary for arranging the heater 13 and the temperature sensor 14, and the other region, in which the floating structure 92 in the conventional micro vacuum gauge 90 occupies, is made of the high-reflectance thin film 16, which is the second member having a lower emissivity than the first member 15 and the floating structure 92.

The high-reflectance thin film 16 is formed of aluminum used as a wiring metal material in a semiconductor manufacturing process. This allows the semiconductor manufacturing process to be adapted when the micro vacuum gauge 10 is manufactured, which makes easy manufacturing possible. However, the material is not limited to aluminum, but any material including metal such as titanium and gold that has a low emissivity may be used. From technical and cost standpoints, the first member 15 is normally limited to a silicon dioxide film $SiO_2$, a silicon nitride film SiN, a resultant from adding another element on a basis of those, or a resultant from slightly changing their chemical compositions. Thus, the high-reflectance thin film 16 only needs to have a higher reflectance than these materials making the first member 15. Moreover, for the high-reflectance thin film 16, a laminated structure of a plurality of thin films such as photonic crystal, for example, can be employed. The high-reflectance thin film 16 may have a thickness of about 1 μm. Moreover, it is preferable that the high-reflectance thin film 16 has a flat and smooth surface, because a rough surface decreases the reflectance.

Heat conduction through the supporting structure 18 can be reduced by a material and a shape of the supporting structure 18. For example, instead of the simple flat-plate shape as shown in FIGS. 1 and 2, a meander geometry or the like is employed, by which a heat loss by the heat conduction through the supporting structure 18 can be made smaller than a heat loss by heat radiation from the first member 15 and the high-reflectance thin film 16. The present invention is particularly effective in the case where the heat radiation by the heat conduction of the supporting structure 18 is at a level equivalent to, or smaller than a heat loss by the heat conduction of the floating structure 12.

For the micro vacuum gauge 10, a structure in which the first member 15 and the high-reflectance thin film 16 as the second member are in contact with each other at side surfaces thereof is shown in FIGS. 1 and 2. In fact, these two members 15, 16 are, however, configured to satisfy the manufacturing process and design rules so as to be solidly joined mechanically and thermally. For example, the micro vacuum gauge is configured in a structure in which the high-reflectance thin film 16 is placed over a part of the first member 15, in a structure in which the first member 15 is made of the laminated structure of the plurality of thin films, and the high-reflectance thin film 16 breaks into a part of the first member 15, or in a structure in which the high-reflectance thin film 16 is placed under the first member 15.

Next, operation of the micro vacuum gauge 10 is described. The micro vacuum gauge 10 measures a heat loss from the first member 15 with the heater 13 and the temperature sensor 14 arranged therein and the high-reflectance thin film 16, as change in temperature or change in supplied power. Here, as one example of the operation, a case where a constant power is supplied to the heater 13 is described.

When a constant current is passed through the heater 13 through the heater wirings 13a, 13b to drive so as to consume the constant power in the heater 13, the temperatures of the first member 15 and the high-reflectance thin film 16 solidly joined thermally with the first member 15 rise. At this time, the change in temperature (difference in temperature between the semiconductor substrate 11, and the first member 15 and the high-reflectance thin film 16) from a time when the heater 13 is not energized is decided by the power supplied to the heater 13, the heat loss by the heat conduction of the supporting structure 18, the heat loss by the heat conduction from the first member 15 and the high-reflectance thin film 16 through gas surrounding these, the heat loss by the heat radiation from the first member 15 and the high-reflectance thin film 16.

Dependency of a heat loss in the whole of the first member 15 and the high-reflectance thin film 16 on a pressure of the gas in view of the above-described three types of heat loss mechanisms is, as shown in FIG. 3, similarly to the conventional micro vacuum gauge 90, divided into the region R1, which is a high pressure region where the fact that the heat conduction of the gas does not depend on the pressure is reflected, so that the heat loss does not depend on the pressure, the region R2 where the heat conduction through the gas is proportional to the pressure of the gas, so that with decrease in pressure, the heat loss decreases, and the low-pressure region R3 at a lowest level of the heat loss, which is decided by the resultant from adding the heat loss by the heat conduction through the supporting structure 18 and the heat loss by the heat radiation from the first member 15 and the high-reflectance thin film 16, and in which the heat loss does not depend on the pressure of the gas.

As to the transmission, absorption and reflection of light, Kirchhoff's law is established, and since in one member, the resultant from adding all these gives the whole incident light, the resultant from adding respective ratios thereof is one. An emissivity that decides radiation from an object coincides with an absorptance, and thus, an emissivity of an object having a reflectance close to 1 is very low.

Characteristics of the conventional micro vacuum gauge 90 are indicated by a dashed line in FIG. 3. As understood from this, in the micro vacuum gauge 10, the heat loss by the radiation from the portion where the conventional floating structure 92 is replaced by the high-reflectance thin film 16 is decreased, by which the heat loss resulting from adding the heat loss by the heat conduction through the supporting structure 18, and the heat loss by the heat radiation from the first member 15 and the high-reflectance thin film 16 is made smaller by ΔQ. For example, when the heat loss by the heat conduction through the conventional supporting structure 98 is made negligibly small as compared with the heat loss by the heat radiation from the floating structure 92, most of the conventional floating structure 92 is replaced by the high-reflectance thin film 16, and further the heat loss by the heat conduction through the supporting structure 18 is made negligibly small as compared with the heat loss by the heat radiation from the first member 15 and the high-reflectance thin film 16, that is, when a lower limit of the measurable region (region R2) in the conventional and present embodiments is decided by the heat radiation, the heat loss in the region R3 can be made smaller almost by a ratio between the emissivity of the conventional floating structure 92 and the emissivity of the high-reflectance thin film 16.

As to the characteristics of the region R2, by replacing the conventional floating structure 92 by the high-reflectance thin film 16, an energy exchange ratio with the gas in a structure surface is changed. Since this change is sufficiently smaller than the change of the emissivity, the use of the micro vacuum gauge 10 of the present invention moves the pressure at the time of shift from the region R2 to the region R3 to the lower pressure side by ΔP equivalent to the decrease in heat loss by the radiation, so that a measurable pressure range is expanded to the lower pressure side. A measurable pressure lower limit becomes, for example, about $1 \times 10^{-2}$ Pa.

While in the micro vacuum gauge 10, the number of the supporting structures 18 is one, and the supporting structure 18 has a rectangular flat plate-like structure, the number of the supporting structures 18 may be plural, and it may have a complex shape such as meander geometry. Moreover, the supporting structure 18 may be structured to be connected not only to the first member 15 but also the high-reflectance thin film 16.

Moreover, while in the micro vacuum gauge 10, the first member 15 has a rectangular flat plate-like structure connected to the supporting structure 18, because of limitation by the manufacturing process or design rules, or for stress adjustment, and improved strength of the structure, the first member 15 can be formed into a band around the whole or partial circumference of the high-reflectance thin film 16, or can be arranged in a branch shape in an extending surface of the high-reflectance thin film 16. Moreover, while it is preferable that in the high-reflectance thin film 16, an area in top view is larger, even if the area is small due to various design limitations, the effect is ratiometrically brought about.

Next, a micro vacuum gauge 20 according to a second embodiment of the present invention is described with reference to the drawings. In the micro vacuum gauge 20, as shown in FIG. 4, a floating structure 22 is held by the supporting structure 18 so as to almost cover the upper side of the depressed portion 17, a first member 25 of the same planar size (in top view) as that of the floating structure 22 is formed, and high-reflectance films 26a, 26b as the second members are formed across the whole of an upper surface and a lower surface of this first member 25. In top view, the first member 25 occupies the region which the first member 15 and the high-reflectance film 16 in the aforementioned micro vacuum gauge 10 occupy. That is, the micro vacuum gauge 20 has a structure in which the high-reflectance thin films 26a, 26b are added to an upper surface and a lower surface of the floating structure 92 of the conventional micro vacuum gauge 90 shown in FIGS. 16 and 17 to be formed.

Since reflection is decided by a material and a structure of an outmost surface layer, as in the aforementioned micro vacuum gauge 10, the micro vacuum gauge 20 also reduces the heat loss in the region R3 by the decrease of the radiation from the high-reflectance films 26a, 26b, so that the measurable range can be expanded to the lower pressure side. While in the micro vacuum gauge 20, the high-reflectance thin films 26a, 26b are formed across the whole surfaces of both the upper and lower surfaces of the first member 25 so as to cover the whole upper and lower surfaces of the floating structure 22, they may not be formed across the whole surfaces, but may be formed only on one of the upper surface and the lower surface.

Next, for a micro vacuum gauge 30 according to a third embodiment of the present invention, only different points from the micro vacuum gauge 10 are described. The micro vacuum gauge 30, as shown in FIGS. 5 and 6, has the same structure as that of the micro vacuum gauge 10 except that the high-reflectance thin film 16 of the micro vacuum gauge 10 shown in FIGS. 1 and 2 is replaced by a high-transmittance thin film 36.

Taking the above-described Kirchhoff's law into consideration, a material with a transmittance close to 1 has a very small emissivity. Thus, for a reason similar to the reason stated in the description of the operation of the micro vacuum gauge 10, the measurable pressure range can be expanded to the lower pressure side. Normally, a temperature region of an environment in which the micro vacuum gauge operates is 200° C. to 300° C. at the highest, and radiated light is light in an infrared region. While as a material used for the high-transmittance thin film 36, low-concentration doping polysilicon or the like having a high transmittance to the light in this region is preferable, the material is not limited to this, but a similar effect can be obtained as long as a material having a high transmittance to infrared rays that a black body near an operation temperature radiates is used. Moreover, the micro vacuum gauge 30 is not limited to the structure and the shape shown in FIGS. 5 and 6, but the modifications in design, which have been described as to the micro vacuum gauge 10, can be made as needed.

Next, for a micro vacuum gauge 40 according to a fourth embodiment of the present invention, only different points from the micro vacuum gauge 10 are described. The micro vacuum gauge 40, as shown in FIGS. 7 and 8, does not hold the floating structure 12 at almost the same height as the upper surface of the semiconductor substrate 11 as in the micro vacuum gauge 10, but holds the floating structure 42 by a supporting structure 48 in a state where the floating structure 42 is elevated upward from an upper surface of a semiconductor substrate 41. Thus, a depressed portion does not need to be formed in the upper surface of the semiconductor substrate 41.

The operation of this micro vacuum gauge 40 is also similar to that of the micro vacuum gauge 10, and the heat loss in the region R3 is reduced by the decrease in radiation from the high-reflectance thin film 16, and the measurable range can be expanded to the lower pressure side. Moreover, the micro vacuum gauge 40 is not limited to the structure and the shape shown in FIGS. 7 and 8, but the modifications in design, which have been described as to the micro vacuum gauge 10, can be made as needed.

Next, the micro vacuum gauge 50 according to a fifth embodiment of the present invention is described. The micro vacuum gauge 50 has a structure in which a high-reflectance thin film 56 is added on the lower surface of the semiconductor substrate 11 to the conventional micro vacuum gauge 90, as shown in FIG. 9. In the upper surface of the semiconductor substrate 11, the depressed portion 17 is formed. It is difficult to form the high-reflectance thin film on an upper surface of this depressed portion 17. Consequently, the high-reflectance thin film 56 is additionally formed on the back surface of the semiconductor substrate 11.

While supply and reception of energy by radiation is performed between a floating structure 52 and a peripheral object, if a reflectance of any of the objects becomes high, the transmitted energy decreases. Thus, in the micro vacuum gauge 50, the reflectance of the peripheral object is increased to decrease energy loss by the radiation, so that the heat loss in the region R3 is reduced, by which the measurable range is expanded to the lower pressure side. Since silicon, which is the material of the semiconductor substrate 11, is highly transparent to the infrared rays carrying the energy of the radiation, the above-described effect can be obtained.

Next, a micro vacuum gauge 50' according to a modification of the fifth embodiment of the present invention is described. In the micro vacuum gauge 50', as shown in FIG. 10, similarly to the aforementioned micro vacuum gauge 40, a depressed portion is not formed in the upper surface of the semiconductor substrate 41, and a floating structure 52' is elevated and held by the supporting structure 48. A high-reflectance thin film 56' is formed on an upper surface of an insulating film 49 formed on the semiconductor substrate 41. The micro vacuum gauge 50', similarly to the micro vacuum gauge 50, increases the reflectance of the peripheral object of the floating structure 52' to decrease the energy loss by the radiation, so that the heat loss in the region R3 is reduced, by which the measurable range is expanded to the lower pressure side.

The floating structures 52, 52' radiate the infrared rays both upward and downward. Thus, the micro vacuum gauges 50, 50' have an effect of decreasing only the energy radiated downward in the energy radiated from the floating structures 52, 52', and the effect is almost half the effect of the micro vacuum gauge 20. This embodiment can also be used in combination with another embodiment to complement the effect of the micro vacuum gauge.

Next, a micro vacuum gauge 60 according to a sixth embodiment of the present invention is described. The micro vacuum gauge 60, as shown in FIG. 11, has a structure in which a high-reflectance thin film 66 covering the upper side of the floating structure 52 at a space is added to the aforementioned conventional micro vacuum gauge 90. The depressed portion 17 is formed in an upper surface of the semiconductor substrate 11. The high-reflectance thin film 66 is formed so as to extend upward in the upper surface of the insulating film 19 on the semiconductor substrate 11. The high-reflectance thin film 66 is formed so as to overlap the floating structure 52 in top view. The micro vacuum gauge 60 has an effect of decreasing only the energy radiated upward in the energy radiated from the floating structure 52, which is an upside-down effect of the micro vacuum gauge 50. This embodiment can be realized in a form of being added to another embodiment, and the effect of the micro vacuum gauge can be further enhanced.

Next, a micro vacuum gauge 60' according to a modification of the sixth embodiment of the present invention is described. In the micro vacuum gauge 60', as shown in FIG. 12, a high-reflectance thin film 66' covering the upper side of the floating structure 52' at a space is formed on the upper surface of the insulating film 49 formed on the semiconductor substrate 41. The high-reflectance thin film 66' is formed so as to overlap the floating structure 52' in top view. The micro vacuum gauge 60' has the effect of decreasing only the energy radiated upward in the energy radiated from the floating structure 52', which is an upside-down effect of the micro vacuum gauge 50'. This embodiment can be realized in a form of being added to another embodiment, and the effect of the micro vacuum gauge can be further enhanced.

Next, a micro vacuum gauge 70 according to a seventh embodiment of the present invention is described. In the micro vacuum gauge 70, as shown in FIG. 13, while a micro vacuum gauge element L made up of the semiconductor substrate 11, the floating structure 52, the supporting structure 18 and the like has the same structure as the conventional one (exactly the same as the aforementioned conventional micro vacuum gauge 90), a high-reflectance thin film 76 is formed on a joint surface with the micro vacuum gauge element L of a package substrate M, on which the micro vacuum gauge element L is mounted. The high-reflectance thin film 76 is formed so as to overlap the floating structure 52 in top view. The micro vacuum gauge 70, similarly to the micro vacuum gauge 50, has the effect of decreasing only the energy radiated downward in the energy radiated from the floating structure 52. This embodiment can be realized in a form of being added to another embodiment, and the effect of the micro vacuum gauge can be further enhanced.

Next, a micro vacuum gauge 70' according to a modification of the seventh embodiment of the present invention is described. In the micro vacuum gauge 70', as shown in FIG. 14, a hollow space S' penetrating vertically in a semiconductor substrate 71 of the micro vacuum gauge element L' is formed, and a floating structure 72 is supported by a supporting structure 78 in a form of both-end support. The high-reflectance thin film 76 is formed on a joint surface with the micro vacuum gauge element L' of the package substrate M, on which the micro vacuum gauge element L' is mounted. Furthermore, since the hollow space S' is formed so as to penetrate the semiconductor substrate 71, it is common to perform anisotropic etching from a back surface of the semiconductor substrate 71. In this case, the hollow space S' has a shape opened in a lower surface. This allows the high-reflectance thin film 76' to be formed on an inner surface of the semiconductor substrate 71 surrounding the hollow space S', which can further enhance the effect.

A micro vacuum gauge 80 according to an eighth embodiment of the present invention is described. In the micro vacuum gauge 80, as shown in FIG. 15, a high-reflectance thin film 86 is formed on inner surfaces of a package cap N that is attached to the package substrate M on which the micro vacuum gauge element L is mounted to encompass the micro vacuum gauge element L from above. The high-reflectance thin film 86 is formed so as to overlap the floating structure 52 in top view. The micro vacuum gauge 80, similarly to the micro vacuum gauge 60, has the effect of decreasing only the energy radiated upward in the energy radiated from the floating structure 52. This embodiment can also be realized in a form of being added to another embodiment, and the effect of the micro vacuum gauge can be further enhanced.

INDUSTRIAL APPLICABILITY

As described above, since in the micro vacuum gauge according to the present invention, the measurable range on the lower pressure side is expanded as compared with the conventional micro vacuum gauge, the measurement of a pressure lower than a pressure level required as an upper limit pressure in a thermal infrared sensor or the like is enabled. Since the micro vacuum gauge according to the present invention can be manufactured by the same technique as the manufacturing process for manufacturing the thermal infrared sensor, it is integrated in the thermal infrared sensor so that it can be applied to analysis of influence of deterioration in vacuum degree in a reliability test, or self-diagnosis of a product used in a real field. As to the MFMS devices, the vacuum sealing technique is considered to be a key technique to attain high performance and high reliability in an acceleration sensor, an angular speed sensor, which are physical quantity sensors, and in a technical field called an RF MEMS (Radio Frequency MEMS), and the micro vacuum gauge can be expected to be integrated and used in the above-described devices. Moreover, although the micro vacuum gauge according to the present invention not manufactured by the MEMS technique is limited in target of use because of its large size, once the micro vacuum gauge has performance equal to the conventional vacuum gauge in the measurable range, the application field is considered to be expanded to a micro-region pressure measurement other than the MEMS device.

The invention claimed is:

1. A micro vacuum gauge, comprising:
   a substrate;
   a floating structure that is held above the substrate by a supporting structure extending from the substrate in a state where the floating structure is thermally isolated from the substrate;
   a heat generator that is arranged in the floating structure to generate heat; and
   a temperature sensor that is arranged in the floating structure to measure a difference in temperature between the substrate and the floating structure, wherein the floating structure is formed of a first member surrounding the heat generator and the temperature sensor, and a second member having a lower emissivity than the first member and joined to at least a surface of the first member, and an area of the second member in top view is larger than that of the first member.

2. The micro vacuum gauge according to claim 1, wherein a depressed portion is formed in an upper surface of the substrate, and the floating structure is held above the depressed portion by the supporting structure.

3. The micro vacuum gauge according to claim 1, wherein an upper surface of the substrate is formed flatly, and the floating structure is held by the supporting structure so as to be elevated upward from the upper surface of the substrate.

4. The micro vacuum gauge according to claim 1, wherein the second member is made of a laminated structure of a plurality of thin films.

5. The micro vacuum gauge according to claim 1, wherein the second member has a higher reflectance than the first member.

6. The micro vacuum gauge according to claim 5, wherein the first member is made of silicon dioxide or silicon nitride, and the second member is made of aluminum, titanium, gold, tungsten or platinum.

7. A micro vacuum gauge, comprising:

a substrate;

a floating structure that is held above the substrate by a supporting structure extending from the substrate in a state where the floating structure is thermally isolated from the substrate;

a heat generator that is arranged in the floating structure to generate heat; and a temperature sensor that is arranged in the floating structure to measure a difference in temperature between the substrate and the floating structure, wherein the floating structure is formed of a first member surrounding the heat generator and the temperature sensor, and a second member having a lower emissivity than the first member and joined to at least a surface of the first member, and the second member has a higher transmittance than the first member.

8. The micro vacuum gauge according to claim 7, wherein the first member is made of silicon dioxide or silicon nitride, and the second member is made of single-crystal silicon, polycrystalline silicon, or amorphous silicon.

9. A micro vacuum gauge, comprising:

a substrate;

a floating structure that is held above the substrate by a supporting structure extending from the substrate in a state where the floating structure is thermally isolated from the substrate;

a heat generator that is arranged in the floating structure to generate heat; and a temperature sensor that is arranged in the floating structure to measure a difference in temperature between the substrate and the floating structure, wherein a depressed portion is formed in an upper surface of the substrate, and the floating structure is held above the depressed portion by the supporting structure, while a member that reflects the infrared rays to decrease energy loss by radiation from the floating structure is formed on a back surface of the substrate.

* * * * *

UNITED STATES PATENT AND TRADEMARK OFFICE
CERTIFICATE OF CORRECTION

| | |
|---|---|
| PATENT NO. | : 8,258,509 B2 |
| APPLICATION NO. | : 12/865139 |
| DATED | : September 4, 2012 |
| INVENTOR(S) | : Kimata |

It is certified that error appears in the above-identified patent and that said Letters Patent is hereby corrected as shown below:

On the Title page of the patent, item [75], in the identification of the inventor, please replace "Masafuni Kimata" with "Masafumi Kimata."

On the Title page of the patent, item [75], in the identification of the inventor, please replace "Kusatsu" with "Shiga."

Signed and Sealed this
Twentieth Day of November, 2012

David J. Kappos
*Director of the United States Patent and Trademark Office*